(12) United States Patent  (10) Patent No.: US 7,949,830 B2
Allen, Jr. et al.  (45) Date of Patent: *May 24, 2011

(54) SYSTEM AND METHOD FOR HANDLING DATA REQUESTS

(75) Inventors: James Johnson Allen, Jr., Raleigh, NC (US); Steven Kenneth Jenkins, Raleigh, NC (US); James A. Mossman, Raleigh, NC (US); Michael Raymond Trombley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 598 days.

This patent is subject to a terminal disclaimer.

(21) Appl. No.: 11/953,255

(22) Filed: Dec. 10, 2007

(65) Prior Publication Data

US 2009/0150622 A1  Jun. 11, 2009

(51) Int. Cl.
 G06F 12/00 (2006.01)
 G06F 13/00 (2006.01)
(52) U.S. Cl. . 711/137; 711/141; 711/213; 711/E12.057; 712/207; 712/E9.047; 712/E9.055
(58) Field of Classification Search .................. None
See application file for complete search history.

(56) References Cited

U.S. PATENT DOCUMENTS

| | | | | |
|---|---|---|---|---|
| 5,689,499 | A * | 11/1997 | Hullett et al. | 370/235 |
| 6,233,645 | B1 * | 5/2001 | Chrysos et al. | 711/213 |
| 6,625,707 | B2 | 9/2003 | Bormann | 711/169 |
| 6,704,842 | B1 | 3/2004 | Janakiraman et al. | 711/141 |
| 6,804,750 | B2 | 10/2004 | LaBerge | 711/154 |
| 7,130,967 | B2 | 10/2006 | Arimilli et al. | 711/137 |
| 7,584,294 | B2 | 9/2009 | Plamondon | |
| 7,600,078 | B1 * | 10/2009 | Cen et al. | 711/137 |
| 2002/0087811 | A1 | 7/2002 | Khare et al. | 711/146 |
| 2002/0095301 | A1 | 7/2002 | Villena | |
| 2003/0005252 | A1 * | 1/2003 | Wilson et al. | 711/167 |
| 2003/0079089 | A1 | 4/2003 | Barrick et al. | |
| 2004/0098552 | A1 * | 5/2004 | Kadi | 711/137 |
| 2004/0148470 | A1 | 7/2004 | Schulz | |
| 2004/0162947 | A1 | 8/2004 | Hooker | 711/132 |
| 2005/0117583 | A1 * | 6/2005 | Uchida et al. | 370/395.4 |

(Continued)

OTHER PUBLICATIONS

Office Action for U.S. Appl. No. 11/953,201 dated May 12, 2010.

(Continued)

*Primary Examiner* — Michael C Krofcheck
(74) *Attorney, Agent, or Firm* — Winstead, P.C.

(57) ABSTRACT

A system and method for handling speculative read requests for a memory controller in a computer system are provided. In one example, a method includes the steps of providing a speculative read threshold corresponding to a selected percentage of the total number of reads that can be speculatively issued, and intermixing demand reads and speculative reads in accordance with the speculative read threshold. In another example, a computer system includes a CPU, a memory controller, memory, a bus connecting the CPU, memory controller and memory, circuitry for providing a speculative read threshold corresponding to a selected percentage of the total number of reads that can be speculatively issued, and circuitry for intermixing demand reads and speculative reads in accordance with the speculative read threshold. In another example, a method includes the steps of providing a speculative dispatch time threshold corresponding to a selected percentage of a period of time required to search a cache of the computer system, and intermixing demand reads and speculative reads in accordance with the speculative dispatch time threshold.

11 Claims, 13 Drawing Sheets

U.S. PATENT DOCUMENTS

2005/0155026 A1* 7/2005 DeWitt et al. .................. 717/158
2006/0174228 A1  8/2006 Radhakrishnan et al.
2006/0179175 A1  8/2006 Bockhaus et al.
2006/0294223 A1  12/2006 Glasgow et al.
2007/0214335 A1* 9/2007 Bellows et al. ............... 711/167
2007/0294487 A1* 12/2007 Mino et al. .................... 711/147

OTHER PUBLICATIONS

Office Action from U.S. Appl. No. 11/953,201 dated Oct. 27, 2010.

* cited by examiner

SYSTEM AND METHOD FOR HANDLING DATA REQUESTS

FIELD OF THE INVENTION

The present invention relates in general to computer systems and, more particularly, to handling data requests in computer systems.

BACKGROUND

In order to create a large computing system capable of running many tasks concurrently, it is usually necessary to provide multiple copies of data used by the tasks so that there is often one physically close to the processor running the task. These copies are stored in caches which can be constructed in a variety of sizes and organizations. When a particular process needs a data item, one or more of these caches are searched to see if they contain the desired data and if they do not, then the request will be passed to a memory controller which manages a much larger memory space known as main memory. The goal of maintaining multiple copies of data is to reduce the average amount of time is takes for a particular processor to access the data item that it needs. Searching the caches takes a certain amount of time and if the desired data is not located, that time is added to the total access time required to retrieve the data from the main memory. Thus is can be beneficial to start the access to main memory before it is known whether or not the desired data item is in one of the caches. This is known as a speculative read because if the data is found in a cache, that data will be used and the data retrieved from main memory will be discarded. The other case in which all caches that might possibly contain the desired data are searched before the access to main memory is started is known as a demand read. The drawback to speculative reads is that they consume memory and bus resources which are then not available for data requests other processes.

Accordingly, there is a need in the art for proper weighting between demand and speculative reads to minimize read latency and maximize performance of a memory subsystem.

SUMMARY OF THE INVENTION

The problems outlined above may at least in part be solved in some examples by the disclosed system and method for handling data requests.

In one example, a method for handling speculative read requests for a memory controller in a computer system is provided. The method includes the steps of providing a speculative read threshold corresponding to a selected percentage of the total number of reads that can be speculatively issued, and intermixing demand reads and speculative reads in accordance with the speculative read threshold.

In one example, a computer system includes a CPU, a memory controller, memory, a bus connecting the CPU, memory controller and memory, circuitry for providing a speculative read threshold corresponding to a selected percentage of the total number of reads that can be speculatively issued, and circuitry for intermixing demand reads and speculative reads in accordance with the speculative read threshold.

In one example, a method for handling speculative read requests for a memory controller in a computer system is provided. The method includes the steps of providing a speculative dispatch time threshold corresponding to a selected percentage of a period of time required to search a cache of the computer system, and intermixing demand reads and speculative reads in accordance with the speculative dispatch time threshold.

The foregoing has outlined rather generally the features and technical advantages of one or more examples of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

The foregoing and other features and aspects of the present invention will be best understood with reference to the following detailed description of a specific example of the invention, when read in conjunction with the accompanying drawings, wherein.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
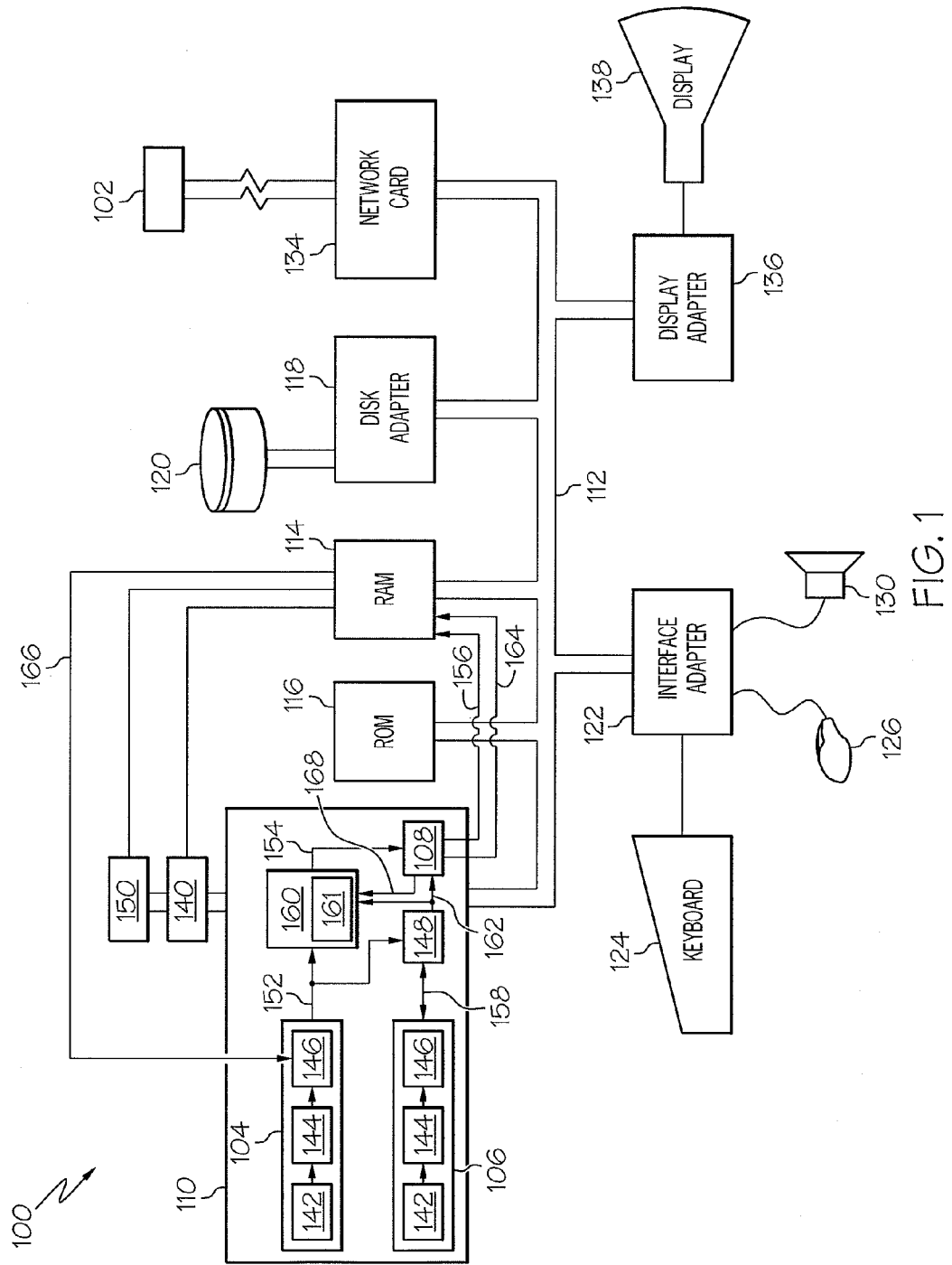
FIG. 1 is an example of a computer system.
Figure 8:
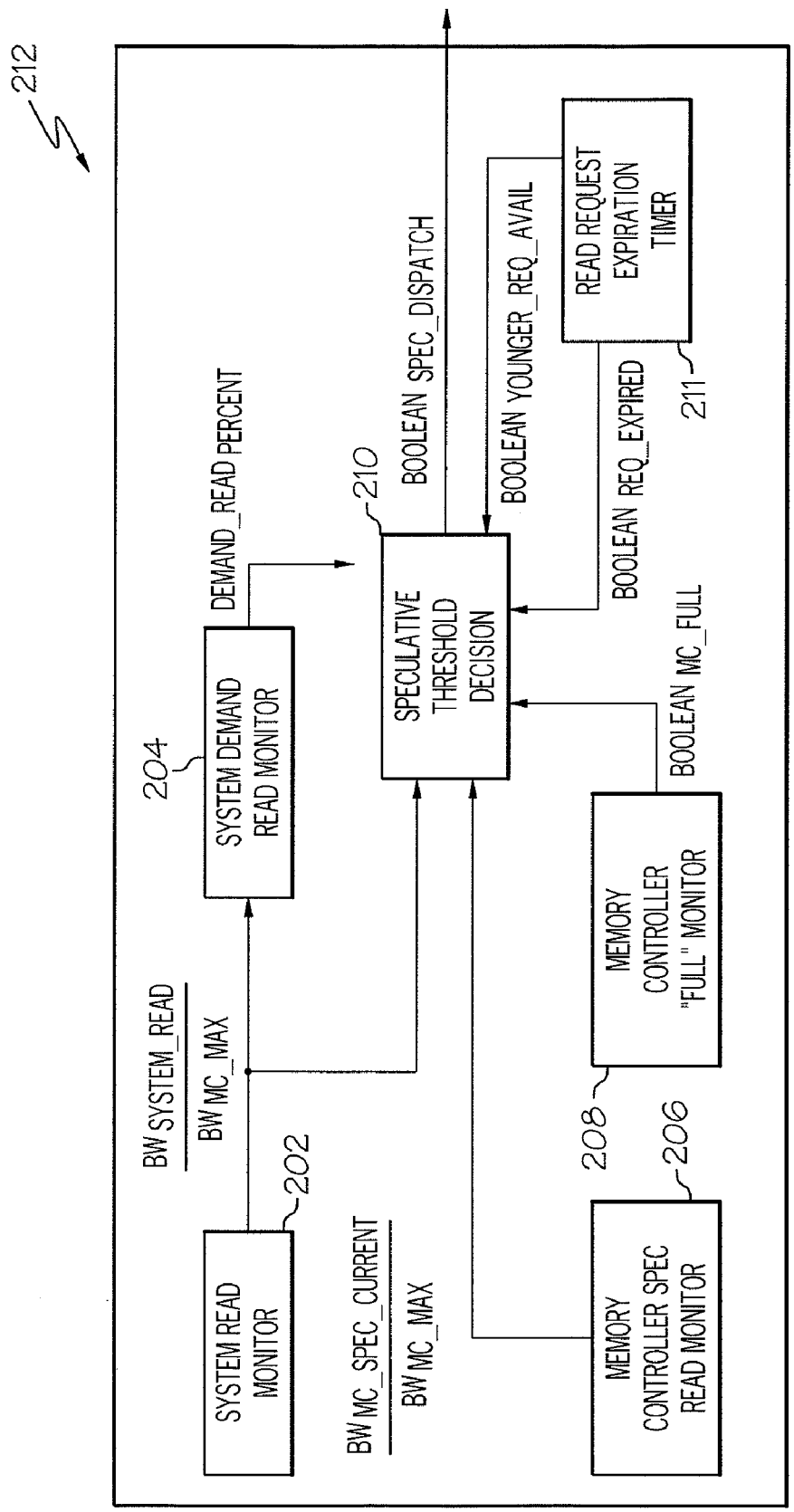
FIG. 8 is an example of algorithm functions of the speculative read threshold algorithm.

A system and method for dynamically adjusting the number of speculative read requests based upon the memory controller workload and rate of incoming requests to reduce memory read latency are provided. In one example, a system and method uses a speculative read threshold algorithm to dynamically intermix demand and speculative memory requests to improve latency. FIG. 1 and the associated description describe an example of a computer system for practicing the disclosed system and method. FIGS. 2-7, Equations 1-46, and the related description describe the derivation of an example of the speculative read threshold algorithm. FIG. 8, Equation 47, Table 1 and the associated description describe an example of the speculative read threshold algorithm.

FIG. 1—Computer System

FIG. 1 illustrates an example of a hardware configuration of computer system 100 which is representative of a hardware environment for practicing examples of the disclosed system and method. Computer system 100 may have a multi-processor system 110 coupled to various other components by system bus 112. An operating system 140 may run on multiprocessor system 110 and provide control and coordinate the functions of the various components of computer system 100. Software programs or applications 150 in accordance with examples of the disclosed system and method may run in conjunction with operating system 140 and provide calls to operating system 140 where the calls implement the various functions or services to be performed by application 150.

Referring to FIG. 1, Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. RAM 114 may comprise dynamic random access memory (DRAM), among other types of memory. It should be noted that software components including operating system 140 and application 150 may be loaded into RAM 114, which may be computer system's 100 main memory for execution. Disk adapter 118 may be an integrated drive electronics ("IDE") adapter that communicates with a disk unit 120, e.g., disk drive.

Referring to FIG. 1, multi-processor system 110 may comprise a first processor 104 and a second processor 106. First and second processors 104 and 106 may each comprise CPU core 142, L1 cache 144 and L2 cache 146. Computer system 100 may comprise memory controller 108 to manage the flow of data to and from the memory of computer system 100, e.g., ROM 116 and RAM 114. Computer system 100 comprises coherency protocol interrogation logic 148 to maintain coherency between first and second processors 104 and 106. Computer system 100 may comprise speculative read threshold algorithm logic 160 to dynamically intermix demand and speculative memory requests in accordance with examples of the disclosed system and method. For example, first processor 104 may issue broadcast read request 152 which is received by logic 148 and logic 160. Logic 160 then outputs logic output 154 to memory controller 108 to indicate whether a speculative read will reduce memory read latency. If so, memory controller 108 may issue speculative read 156. Next, logic 148 issues coherency protocol interrogation 158 to second processor 106. Depending on the result of this interrogation, logic 148 may indicate, via signal 162, that a demand read 164 is needed. Memory controller 108 may recognize demand reads 164 that duplicate previous speculative reads 156. RAM 114 may return read data 166 to first processor 104 in response to either speculative read 156 or demand read 164. Memory controller 108 may provide feedback 168 to logic 160, e.g., to provide parameters for the speculative read threshold algorithm.

Referring to FIG. 1, computer system 100 may further include a communications adapter or network card 134 coupled to bus 112. Communications adapter 134 may interconnect bus 112 with network 102 enabling computer system 100 to communicate with other devices over network 102. I/O devices may also be connected to computer system 100 via a user interface adapter 122 and display adapter 136. Keyboard 124, mouse 126 and speaker 130 may all be interconnected to bus 112 through user interface adapter 122. Data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138 or speaker 130.

The various aspects, features, examples or implementations of the disclosed system and method described herein can be used alone or in various combinations. The disclosed methods can be implemented by software, hardware or a combination of hardware and software. The disclosed system and method can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

Figure 2:
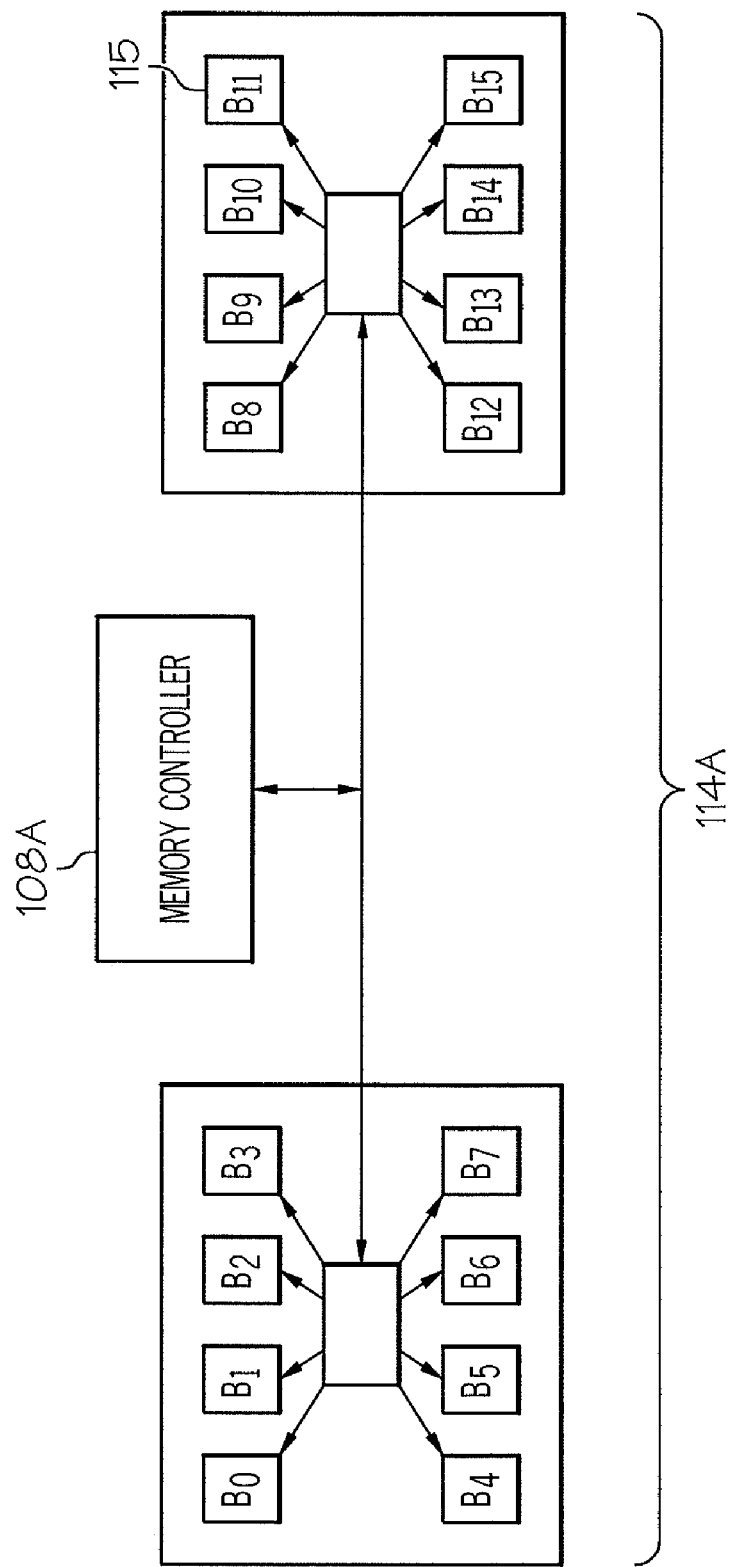
FIG. 2 is a sketch of a DRAM subsystem.

FIG. 2—DRAM Subsystem

FIG. 2 illustrates an example of a dynamic random access memory (DRAM) 114a. For the purposes of the following discussion concerning the calculation of access times (Tram_access), DRAM 114a may be viewed as a collection of multiple independent resources, banks 115. The example of DRAM 114a shown in FIG. 2 comprises sixteen banks 115, shown as B0-B15. The dynamic nature of the storage elements within each bank 115 results in a bank busy penalty whenever multiple reads to the same bank 115 occur within the bank busy window (Tbb). While the address space of memory controller 108a is divided evenly across all banks 115, the probability of multiple system read addresses mapping to the same bank 115 should be taken into account. Because the number of reads greatly exceeds the number of writes for the typical conventional system, the effect of writes on bank 115 accessibility may be ignored in the following analysis.

In the simple case where no bank access collisions occur, DRAM access times may be viewed as the sum of the minimum raw access time (Ta) and the read transfer time (Trd) as shown below in Equation 1:

$$T_{ram\_access} = T_a + T_{rd} \cong T_{ram\_access\_min} \qquad (1)$$

If bank collisions are considered, then additional factors may be considered, including the pattern of read address accesses; the total number of banks 164 in DRAM subsystem 162 (Nb); the current bandwidth utilization (UTILpercentage) and the bank busy precharge window (Tbb). Typically, bank access collisions only occur when multiple reads occur within the bank busy window (Tbb). Because each read transfer (Trd) takes a finite length of time, the average penalty due to the bank busy window (Tbb_delay_average) may be expressed as a probability. For example, a penalty is incurred only in cases where the current read, e.g., RD0 also matches a read access to the same bank 164 within the past bank busy window (Tbb). Accordingly, P(RDn) may be defined as the probability that another read to the same bank 164 as the current read occurred no earlier than n read transfer time slots ago, e.g., n is the number of time slots within the bank busy window (Tbb) that should be considered when looking for a bank access collision. As a result, the average penalty due to the bank busy window (Tbb_delay_average) may be expressed as shown below in Equation 2:

$$T_{bb\_delay\_average} = T_{bb} - (P(RD_1) \times (1 \times T_{rd})) - \qquad (2)$$
$$(P(RD_2) \times (2 \times T_{rd})) \ldots - (P(RD_n) \times (n \times T_{rd}))$$

where $n \leq T_{bb}/T_{rd}$=number of "time slots" within the bank busy window that must be considered when looking for a bank access collision The average access time (Tram_access_average) may be expressed as shown below in Equation 3:

$$T_{ram\_access\_average} = T_a + T_{rd} + T_{bb\_delay\_average} \quad (3)$$

As discussed below, bandwidth utilization may affect the average access time (Tram_access_average). Bandwidth may be described as the number of reads processed in a given time period. Accordingly, bandwidth (BWbb_read) may be expressed in terms of the number of reads (RDbb_read) that occur on average during every bank busy window (Tbb) as shown below in Equation 4:

$$BW_{bb\_read} = RD_{bb\_read}/T_{bb} \quad (4)$$

The maximum bandwidth (BWbb_max_read) may be expressed in terms of the maximum number of reads (RDbb_max_read) as shown below in Equations 5-7:

$$RD_{bb\_read} \leq RD_{bb\_max\_read} \quad (5)$$

$$RD_{bb\_max\_read} = T_{bb}/T_{rd} \quad (6)$$

$$BW_{bb\_max\_read} = RD_{bb\_max\_read}/T_{bb} \quad (7)$$

Current bandwidth utilization (UTILpercentage) may be expressed as shown below in Equation 8:

$$UTIL_{percentage} = BW_{bb\_read}/BW_{bb\_max\_read} \quad (8)$$
$$= RD_{bb\_read}/RD_{bb\_max\_read}$$

Assuming that the pattern of read accesses follows a uniform distribution, each read may be considered statistically independent from one another. The probability that (i) a second read occurs one read transfer time period (Trd) before the current read; and (ii) both the first and second reads map to the same bank 164 may be expressed as shown below in Equation 9:

$$P(B_1) = (RD_{bb\_read}/RD_{bb\_max\_read}) \times (1/N_b) \quad (9)$$

Similarly, the probability that (i) another read occurs two transfer time periods (Trd) before the current read; and (ii) both reads map to the same bank 164 may be expressed as shown below in Equation 10:

$$P(B_2) = (RD_{bb\_read}/RD_{bb\_max\_read}) \times (1/(N_b-1)) \quad (10)$$

The bank collision probability (Pbn), e.g., the probability that the current read maps to the same bank 164 as a read that occurred n read transfer time periods (Trd) ago, may be generalized as shown below in Equation 11:

$$P(B_n) = \begin{cases} 0, & n < 1, n \geq RD_{bb\_max\_read}, \\ \dfrac{UTIL_{percentage}}{N_b - n + 1}, & 1 \leq n, n < RD_{bb\_max\_read}, n < N_b \\ UTIL_{percentage}, & N_b \leq n < RD_{bb\_max\_read} \end{cases} \quad (11)$$

For the purposes of Equation 2, e.g., Tbb_delay_average, P(RDn) should use non-overlapping probabilities. For example, the probability that (i) another read occurs two read transfer time periods (Trd) before the current read; (ii) both reads map to the same bank 164; and (iii) any read during the first read transfer time period (Trd) did not map to the same bank 164, may be expressed as shown below in Equation 12:

$$P(RD_2) = P(B_2) \times (1 - P(B_1)) \quad (12)$$

Accordingly, the probability P(RDn) may be expressed as shown below in Equation 13:

$$P(RD_n) = \begin{cases} P(B_n) \times \prod_{k=1}^{n-1}[1 - P(B_{n-k})], & 1 \leq n < RD_{bb\_max\_read} \\ \prod_{k=1}^{n-1}[1 - P(B_{n-k})], & n = RD_{bb\_max\_read} \end{cases} \quad (13)$$

FIG. 3—Access Time

Figure 3:
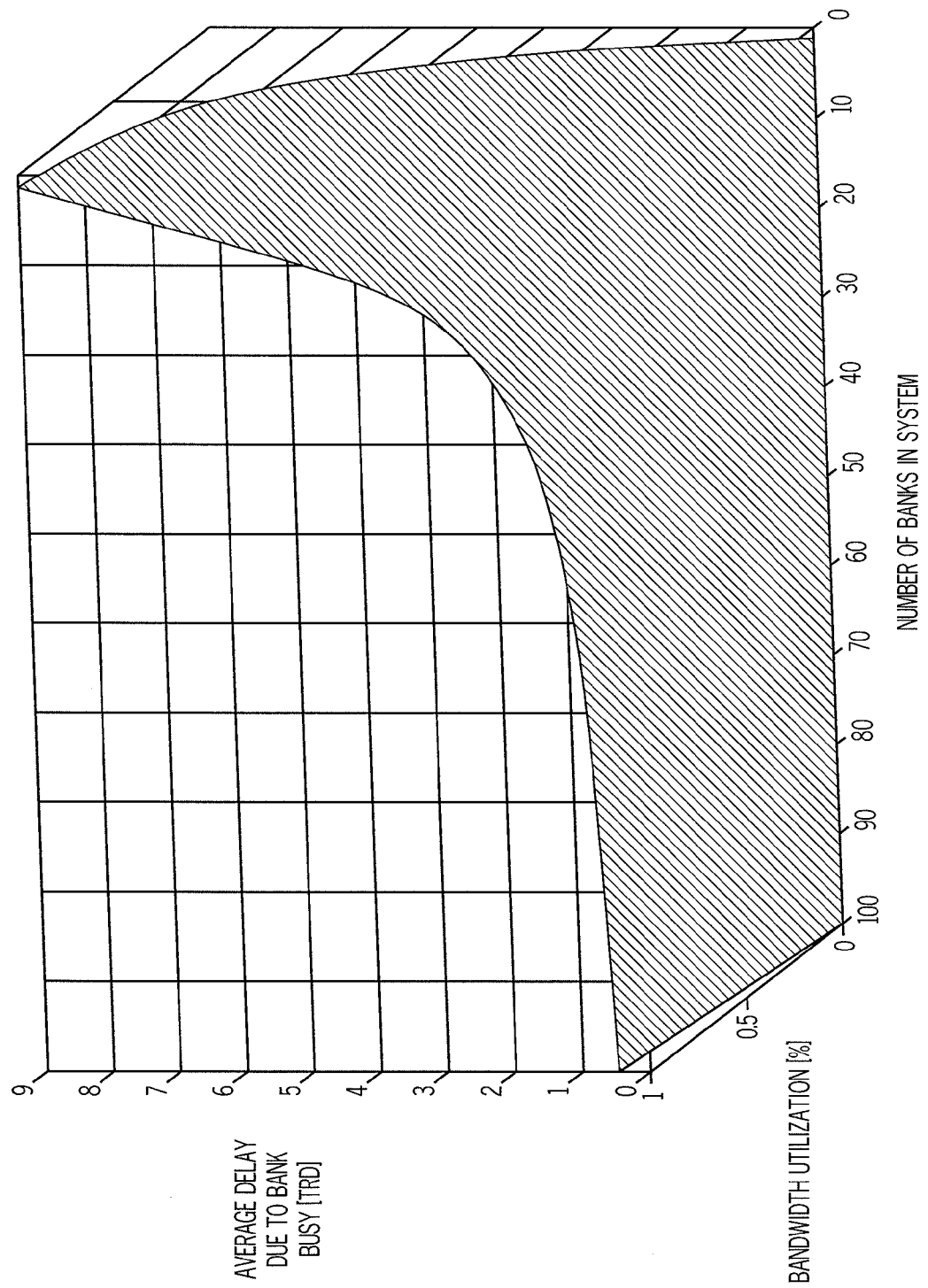
FIG. 3 is a graph showing the average access time for the DRAM subsystem shown in FIG. 2.

With the definition of P(RDn) as expressed in Equation 13, Tram_access_average may be observed in terms of the average penalty due to the bank busy window (Tbb_delay_average) and the maximum number of reads that occur during a bank busy window (RDbb_max_read). For instance, in the example shown in FIG. 3, values of Tbb_delay_average are shown for RDbb_max_read=10. As shown in FIG. 3, as bandwidth utilization (UTILpercentage) approaches zero, the average DRAM access time (Tram_access_average) approaches the ideal minimum access time (Tram_access_min). As the number of banks in a memory subsystem (Nb) increases, the average DRAM access time (Tram_access_average) also approaches the ideal minimum access time (Tram_access_min). Generally, as long as Nb>>RDbb_max_read, Tram_access_min may be considered a good approximation of the average DRAM access time.

Figure 4:
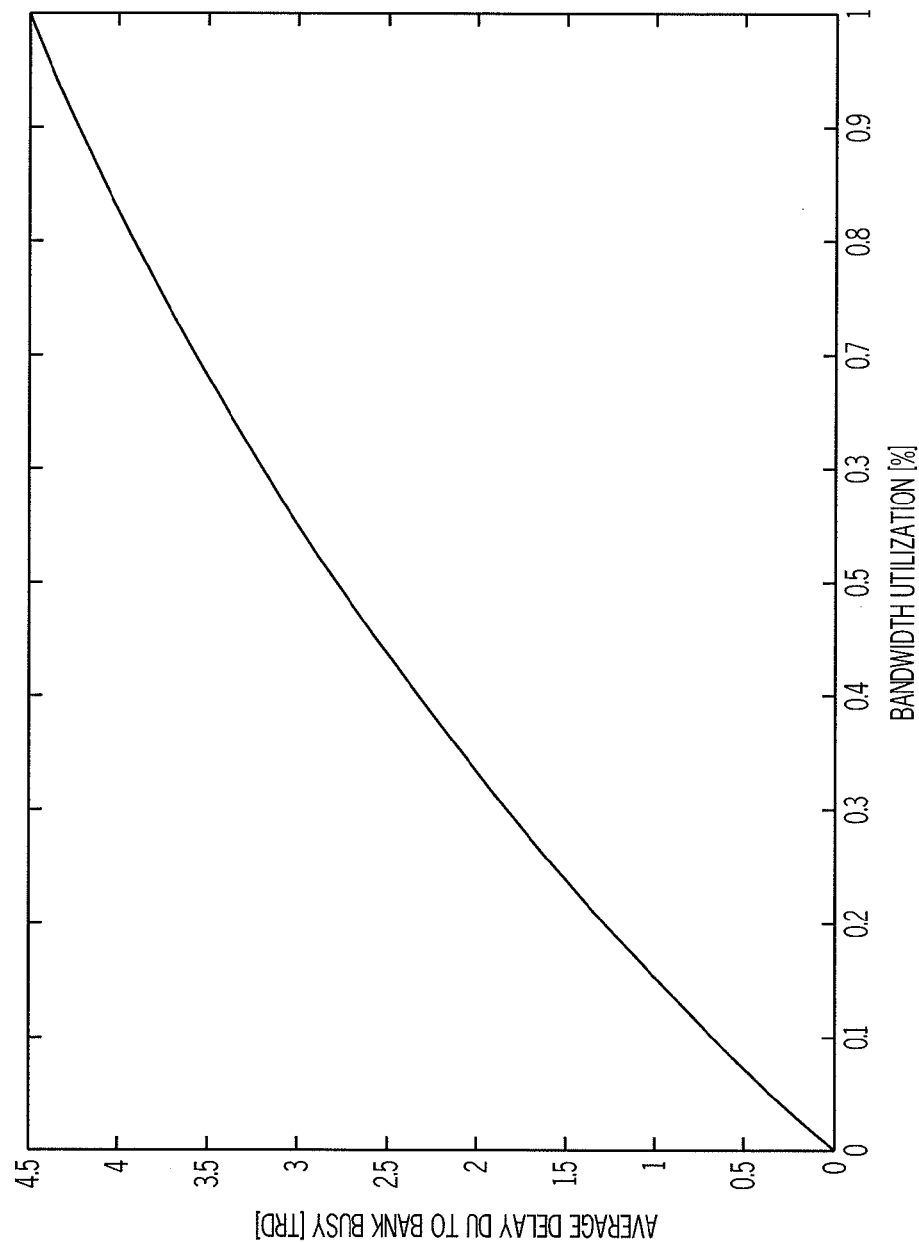
FIG. 4 is a graph showing the average delay caused by bank collisions for the DRAM subsystem shown in FIG. 2.

FIG. 4—Average Delay Caused by Bank Collisions

Typically, for systems at 100% utilization, e.g., UTILpercentage=100%, that have the same number of banks (Nb) as time slots within the bank busy window (RDbb_max_read), a read may be expected to incur, on average, about 50% of the bank busy window as an access delay. FIG. 4 is derived from FIG. 3 and shows an example of the average delay (Tbb_delay_average) caused by bank busy collisions as bandwidth utilization (UTILpercentage) varies, where Nb=RDbb_max_read=10. As shown in FIG. 4, however, the actual average delay is 4.5, and not 5, e.g., 50% of RDbb_max_read. Because the maximum bank busy delay that a read can experience is RDbb_max_read−1, the average delay will be about 50% of the maximum, e.g., in the example shown in FIG. 4, the average delay is 4.5. This "RDbb_max_read−1" factor may also be observed in FIG. 3, where the maximum average delay is shown as 9 when Nb=1, even though RDbb_max_read=10.

For the case of a simple demand-driven read access, the read latency (Tdemand_read) may be expressed as the sum of the latency incurred by a cache miss (Tcache_miss), the latency incurred by a memory space coherency protocol interrogation (Tcoherency_check), and the RAM latency (Tram_access), as shown below in Equation 14:

$$T_{demand\_read} = T_{cache\_miss} + T_{coherency\_check} + T_{ram\_access} \quad (14)$$

From the point of view of the memory controller, Tcache_miss appears to be a fixed value, contributing the same latency to each read. As discussed above, the contribution of Tram_access to latency requires an analysis of several factors, including the probability of certain types of address conflicts, bandwidth utilization, and DRAM constraints, for example. To the memory controller, both Tcache_miss and Tram_access are values over which the memory controller has little to no control. The memory controller can choose to start access ing RAM early, however, prior to receiving the results of the system's coherency protocol, e.g., a speculative read. In the best case scenario, a speculative read may reduce the read latency by effectively eliminating Tcoherency_ check, as shown below in Equation 15:

$$T_{spec\_read} = T_{cache\_miss} + T_{ram\_access} \quad (15)$$

In an idealized system with infinite memory subsystem bandwidth, all reads could be dispatched speculatively to maximize performance. Unfortunately, in systems with large memory spaces, there are several practical considerations that place an upper limit on memory subsystem bandwidth (BWmc_read_max), e.g., finite transistor counts, limitations within RAM systems (e.g., open pages, bank activates, etc.), among other factors. The practical effect of limited bandwidth is that any read received by the memory controller, either demand based or speculative, cannot be serviced if resources are unavailable.

One implication of Equations 14 and 15 is that a read request speculatively dispatched immediately upon receipt tends to have the greatest potential to achieve the full Tcoherency_check latency savings shown by Equation 15. The longer the wait between receipt of a read request and the decision to dispatch speculatively, the lower the potential latency savings and the less dramatic the improvement of the effective latency relative to Equation 14. In some examples (e.g., discussed below in connection with FIG. 8, Equation 47, and Table 1), a system may achieve improved performance by prioritizing "new" read requests while effectively expiring "older" read requests from speculative read consideration. For example, an example may include a time expiration on read requests: read requests received recently are of higher value to a speculative read policy than older read requests. In some examples, read request are not speculatively dispatched greater than or equal to Tcoherency_check after initial receipt, e.g., the coherency logic's response may be expected at any moment, thereby eliminating any advantage of dispatching speculatively.

A speculative read that results in a miss, e.g., the coherency protocol indicates that the read was actually not needed, results in wasted bandwidth within the memory controller. A speculative read that the coherency protocol later validates is viewed as a "hit." Instead of choosing to dispatch a read speculatively, the memory controller may wait for the results from the coherency protocol before issuing a read, e.g., a demand read. The memory subsystem bandwidth (BWmc_read_max) serves as the upper limit on the total bandwidth used by speculative hits and misses (BWmc_spec_read_hit and BWmc_spec_read_miss) plus the bandwidth used for demand reads (BWmc_demand_read), as shown below in Equation 16:

$$BW_{mc\_read\_max} \geq BW_{mc\_spec\_read\_hit} + BW_{mc\_spec\_read\_miss} + BW_{mc\_demand\_read} \quad (16)$$

Bandwidth limitations may also be expressed in terms of the maximum number of reads that may be in-progress simultaneously. For example, the upper limit of the memory subsystem bandwidth (BWmc_read_max) may be expressed as the total number of reads that the memory system can process (RDmc_max) in a finite amount of time (Tmc_max), as shown below in Equations 17-22, where RDmc_current is the current count of reads, RDmc_spec_miss is the current number of speculative reads that result in hits, RDmc_spec_miss is the number of speculative reads that result in misses, and RDmc_demand is the current number of demand reads:

$$BW_{mc\_read\_max} = \frac{RD_{mc\_max}}{T_{mc\_max}} \quad (17)$$

$$RD_{mc\_current} = RD_{mc\_spec\_hit} + RD_{mc\_spec\_miss} + RD_{mc\_demand} \quad (18)$$

$$RD_{mc\_max} \geq RD_{mc\_current} \quad (19)$$

$$BW_{mc\_spec\_read\_hit} = \frac{RD_{mc\_spec\_hit}}{RD_{mc\_max}} \times BW_{mc\_read\_max} \quad (21)$$

$$BW_{mc\_demand\_read} = \frac{RD_{mc\_demand}}{RD_{mc\_max}} \times BW_{mc\_read\_max} \quad (22)$$

Conventional computer systems typically implement an interconnect bus with a bandwidth (BWsystem_read_max) that exceed the memory subsystem's ability to access physical RAM (BWmc_read_max). This excess in the interconnect bus bandwidth provides the ability to implement a number of coherency protocol techniques, including grouping multiple L2 caches into a larger common cache space; and eliminating the need to access physical RAM in those cases where a cache-miss from one L2 cache can be satisfied by data within a different L2 cache. The capabilities of modern coherency protocols should be considered when implementing a memory controller based speculative read policy. Furthermore, because the rate of read requests presented to the systems' memory coherency protocol (BWsystem_read) changes dynamically under varying system loads, the speculative read policy should be capable of adapting to both changing read request patterns and available memory controller resources.

Figure 5:
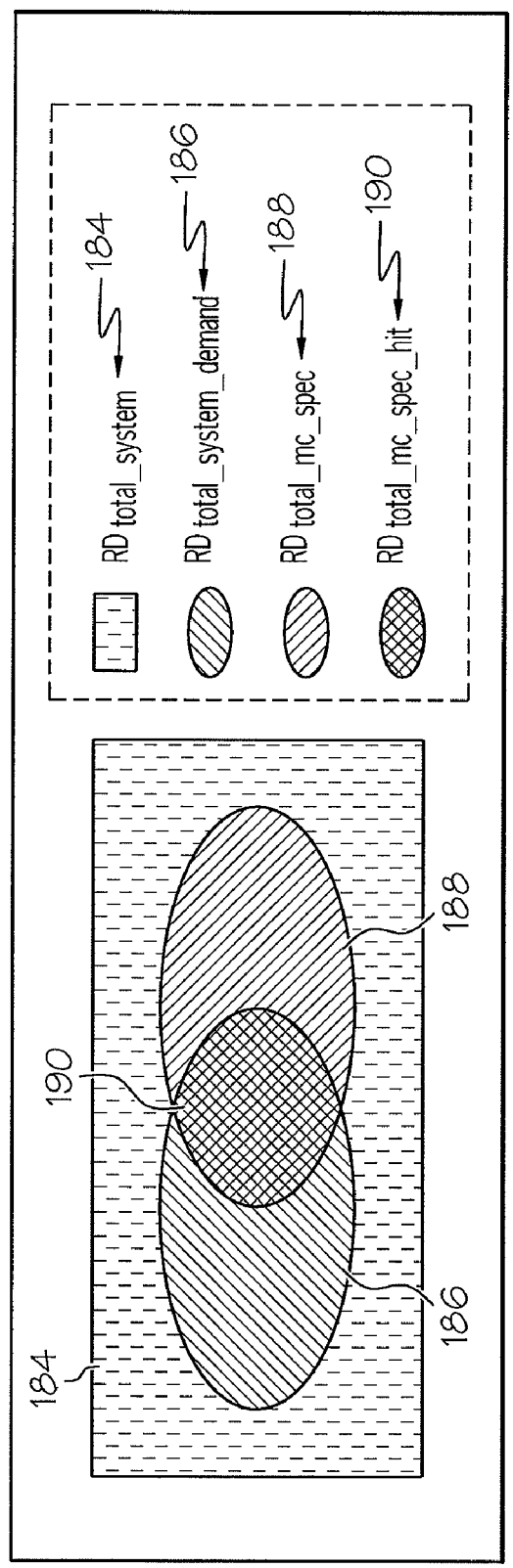
FIG. 5 is a Venn diagram showing the relationship between read types.

FIG. 5—Relationship Between Read Types

Figure 6:
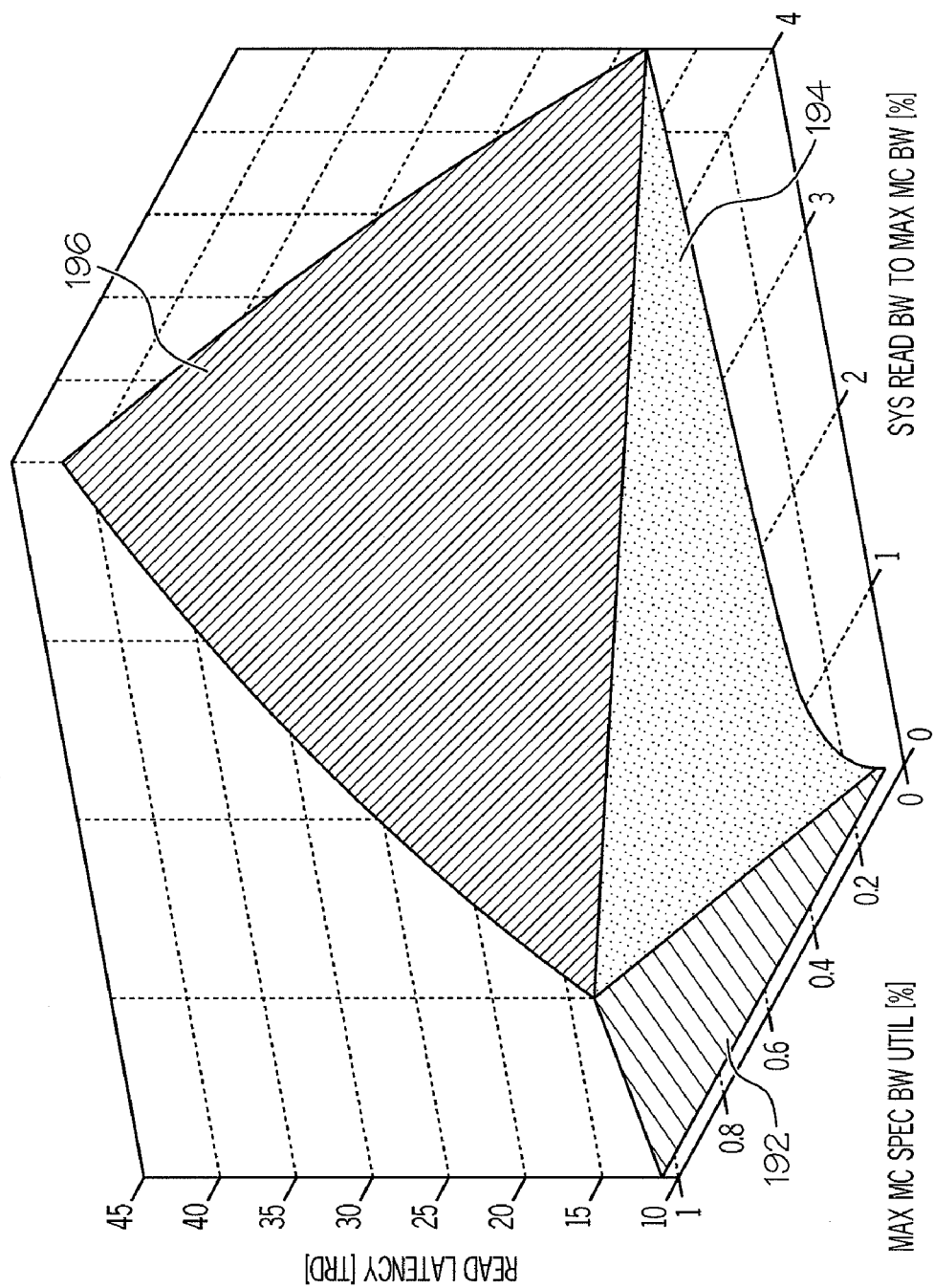
FIG. 6 is a graph showing the average read latency for a system with 25% demand reads.
Figure 7A:
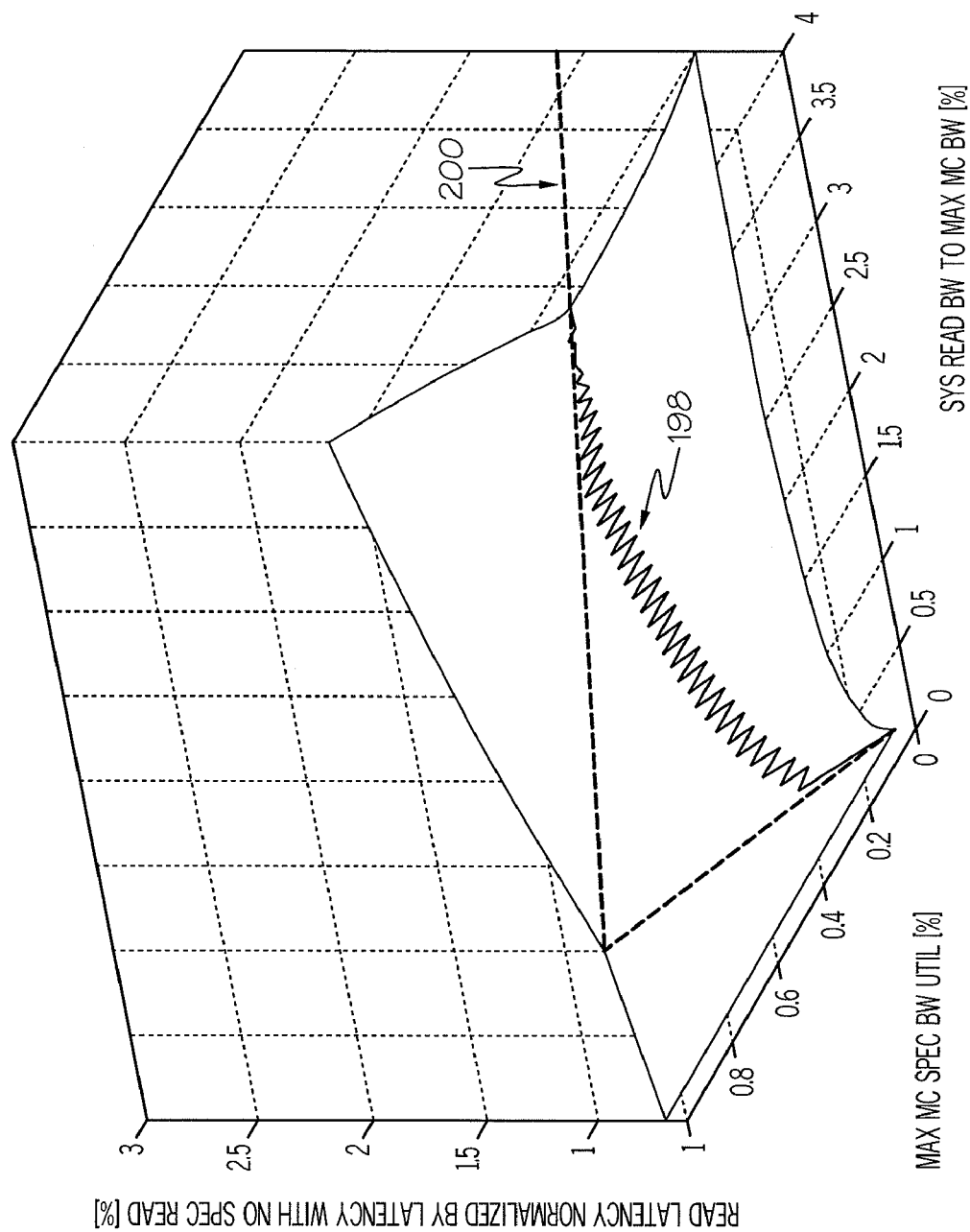
FIGS. 7a-7f are graphs showing normalized read latency for systems with 10%, 25%, 40%, 55%, 70%, and 85% demand reads, respectively.
Figure 7B:
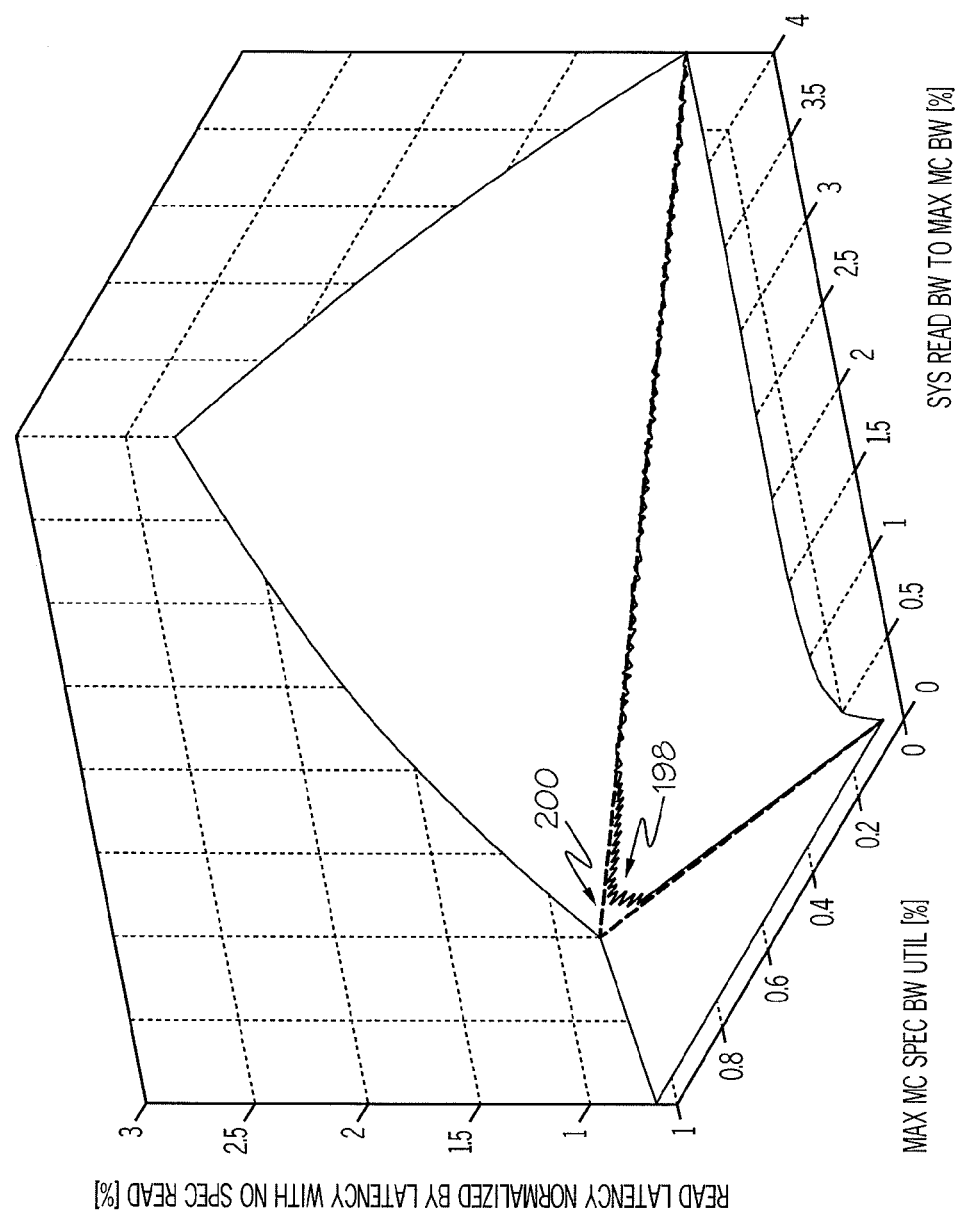
Figure 7C:
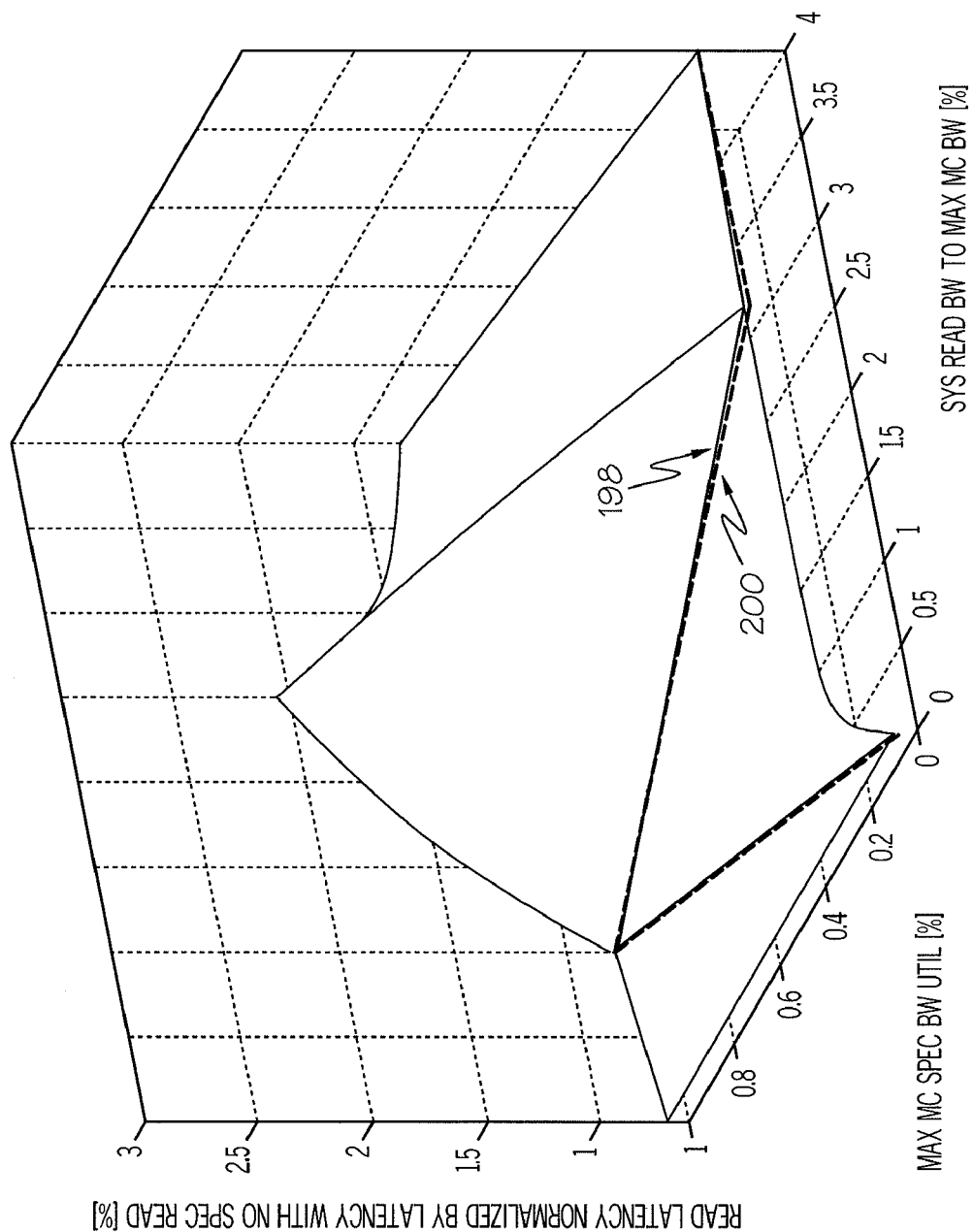
Figure 7D:
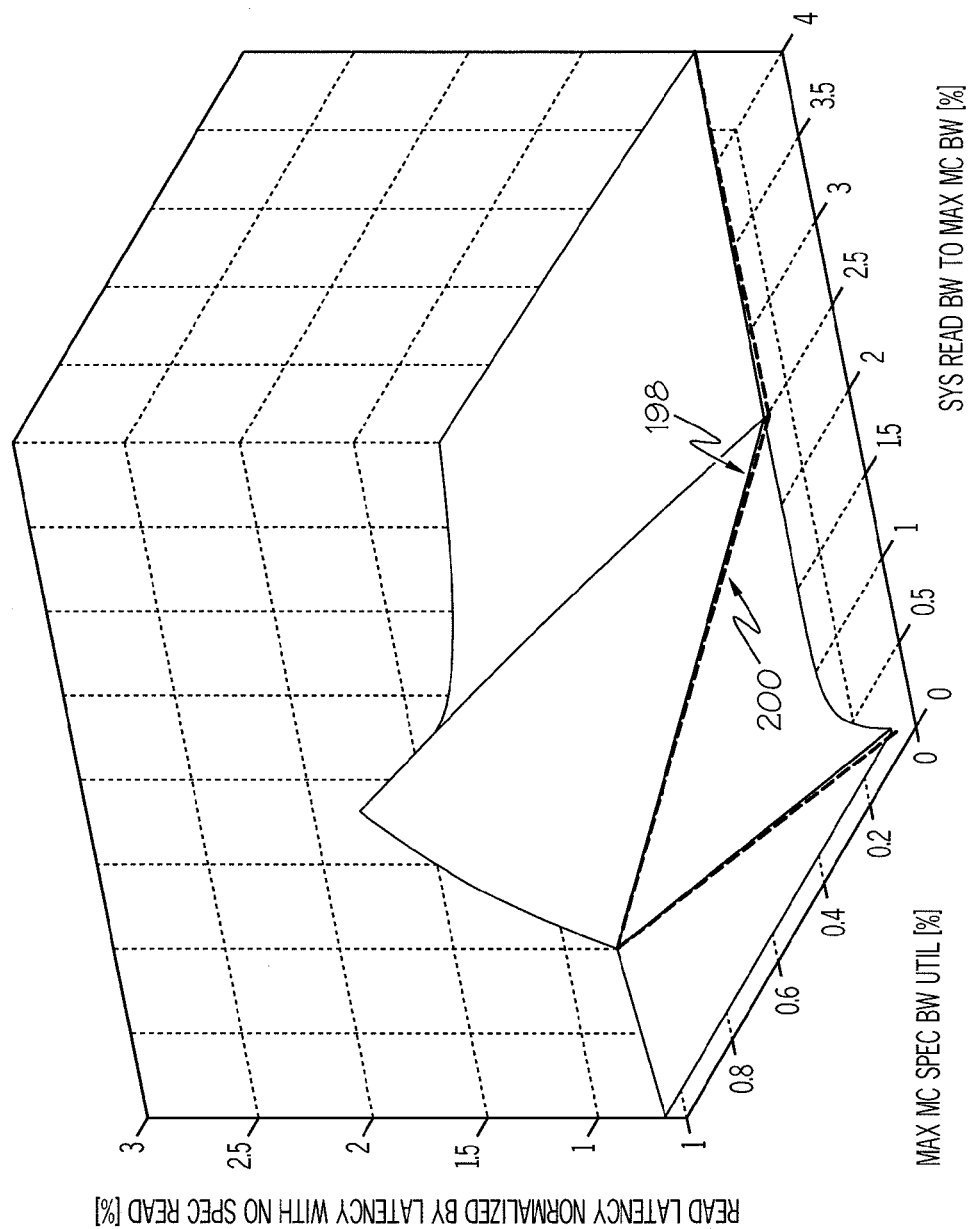
Figure 7E:
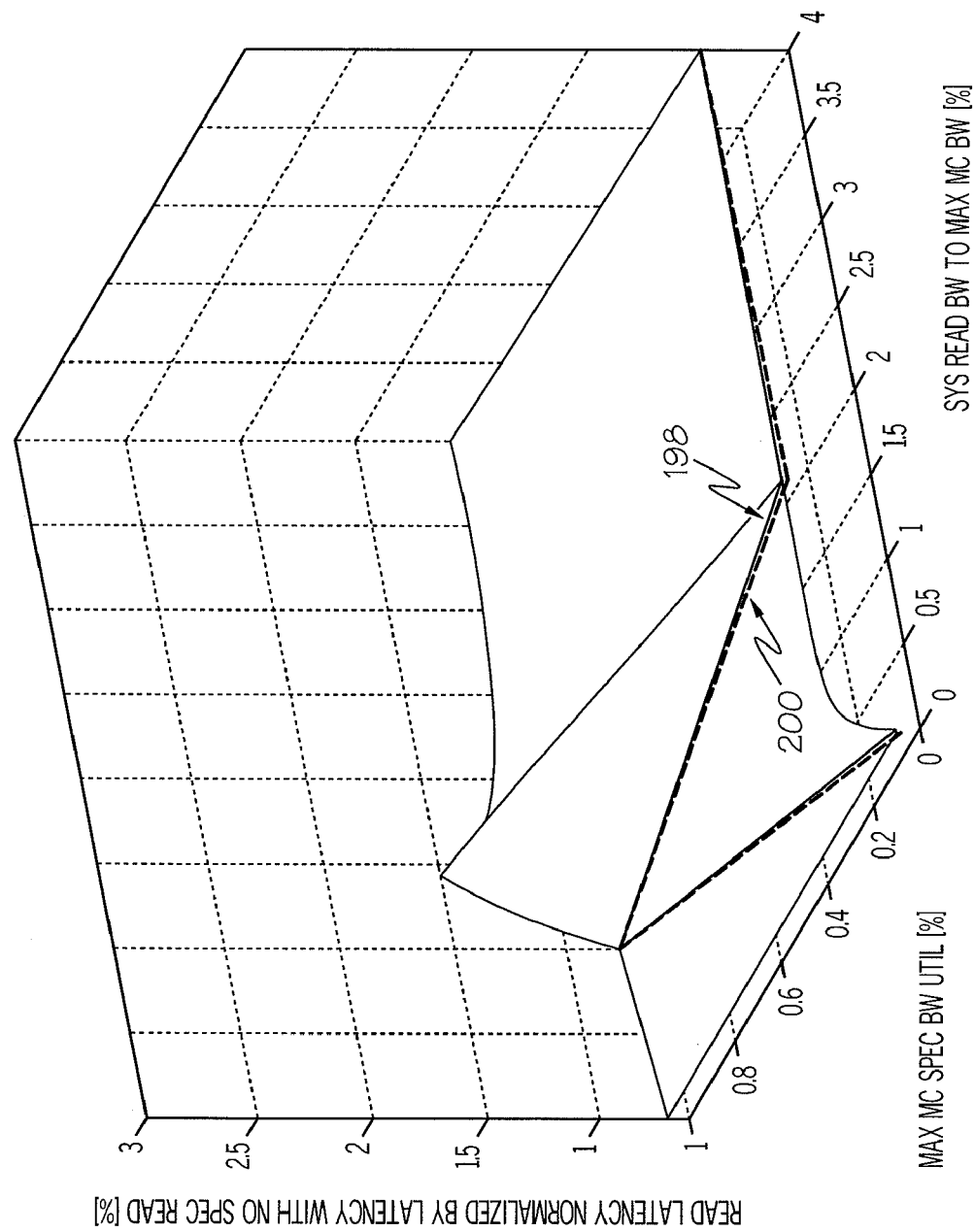
Figure 7F:
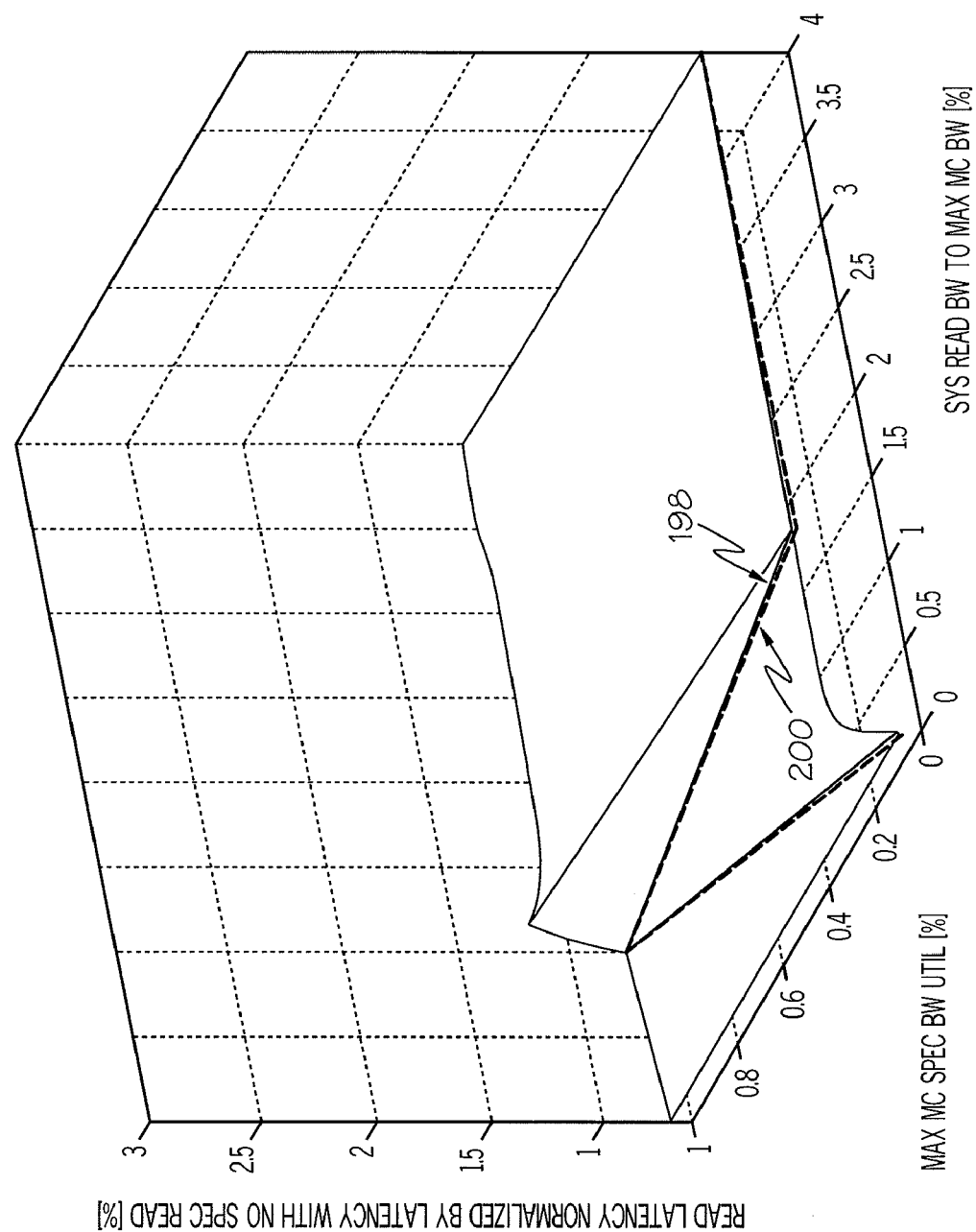

Read requests presented to the coherency protocol (RDtotal_System) represent the total pool of reads from which the memory controller must choose when making speculative dispatch decisions. Once the coherency protocol confirms which reads need to be handled by the memory controller, a subset of raw system reads becomes available (RDtotal_system_demand). Memory controller demand reads (RDtotal_mc_demand) always pull from the system demand read pool (RDtotal_system_demand). However, while all speculative reads (RDtotal_mc_spec) pull from the raw system reads pool (RDtotal_system), speculative reads that result in hits (RDtotal_mc_spec_hit) also share membership in the system demand read set (RDtotal_system_demand). The relationship between these read types are shown in FIG. 6, a Venn set diagram, and in Equations 23-28, as shown below:

$$RD_{total\_system} \geq RD_{total\_system\_demand} \cup RD_{total\_mc\_spec} \quad (23)$$

$$RD_{total\_mc\_spec} = RD_{total\_mc\_spec\_hit} + RD_{total\_mc\_spec\_miss} \quad (24)$$

$$RD_{total\_mc\_spec\_hit} = RD_{total\_system\_demand} \cap RD_{total\_mc\_spec} \quad (25)$$

$$RD_{total\_mc\_spec\_miss} = RD_{total\_mc\_spec} - RD_{total\_mc\_spec\_hit} \quad (26)$$

$$RD_{total\_mc\_demand} = RD_{total\_system\_demand} - RD_{total\_mc\_spec\_hit} \quad (27)$$

$$RD_{total\_mc} = RD_{total\_mc\_spec} + RD_{total\_mc\_demand} \quad (28)$$

As shown in FIG. 6, set 184 correspond to RDtotal_system, set 186 correspond to RDtotal_system_demand, set 188 corresponds to RDtotal_mc_spec, and set 190 corresponds to RDtotal_mc_spec_hit.

A goal of a speculative read policy is to reduce the average read latency to a value less than a normal demand read, as shown below in Equation 29:

$$T_{average\_read} \leq T_{demand\_read} \tag{29}$$

Any speculative read algorithm resulting in the average read latency exceeding that of a demand read will typically adversely affect system performance. Three discrete scenarios may be considered in generating an optimal speculative read policy, as shown below in Equations 30-32:

$$1) \; BW_{system\_read} \leq BW_{mc\_max} \tag{30}$$

$$2) \; BW_{system\_read\_demand} \leq BW_{mc\_max} < BW_{system\_read} \tag{31}$$

$$3) \; BW_{mc\_max} < BW_{system\_read\_demand} \leq BW_{system\_read} \tag{32}$$

For each of the scenarios shown in Equations 30-32, a speculative read policy typically needs to consider only those reads that occur within a fixed time interval (Tmc_read_max). Because a read will complete within the memory controller every Tmc_read_max cycles, regardless of whether the read is a speculative hit, miss or demand read, only those reads that occurred during the previous window need to be examined. This window, e.g., a moving average, may be equivalent to the system read bandwidth as measured on a particular cycle (BWsystem_read[n]), as shown below in Equation 33:

$$BW_{system\_read}[n] = \frac{1}{T_{mc\_read\_max}} \times \sum_{k=0}^{(T_{mc\_read\_max}-1)} RD_{system}[n-k], \tag{33}$$

where $RD_{system}[n] = \{0,$ when no read request occurred on $cycle\#n$
$\{1,$ read request occurred on $cycle\#n$ In the event that the system's current status matches the scenario shown in Equation 30, all system reads may be dispatched speculatively by the memory controller without regard for speculative hit/miss ratios. The basis for this policy may be shown in the examination of average number of cycles per read as shown below in Equations 34-35:

$$T_{average\_read} = \frac{RD_{mc\_spec\_hit}}{RD_{mc}} \times T_{spec\_read} + \tag{34}$$

$$\frac{RD_{mc\_spec\_miss}}{RD_{mc}} \times T_{spec\_read} + \frac{RD_{mc\_demand}}{RD_{mc}} \times T_{demand\_read}$$

$$RD_{mc} = RD_{mc\_spec\_hit} + RD_{mc\_spec\_miss} + RD_{mc\_demand} \tag{35}$$

If the memory controller speculatively dispatches all reads, Equation 34 may be simplified as shown below in Equation 36:

$$T_{average\_read} = \frac{((1 - RD_{mc\_spec\_miss}) + RD_{mc\_spec\_miss})}{(1 - RD_{mc\_spec\_miss} + RD_{mc\_spec\_miss} + 0)} \times T_{spec\_read} + \tag{36}$$

$$\frac{0}{(1 - RD_{mc\_spec\_miss} + RD_{mc\_spec\_miss} + 0)} \times T_{demand\_read}$$

$$= T_{spec\_read}$$

The result shown in Equation 36 stems from the ability of the system to effectively ignore the wasted bandwidth of the speculative misses (BWmc_spec_read_miss). Accordingly, as long as sufficient bandwidth exists to absorb the loss from wasted speculative misses, all reads should be dispatched speculatively by the memory controller. This analysis assumes that the memory controller is able to handle the incoming rate of reads, as shown below in Equation 37:

$$BW_{system\_read} \leq BW_{mc\_spec\_read\_hit} + BW_{mc\_spec\_read\_miss} \leq BW_{mc\_read\_max} \tag{37}$$

To evaluate a speculative read policy for general use, however, situations in which the system read requests exceed the memory controller's ability to process them should be considered. Because a memory controller can only process a finite number of reads (RDmc_max) in a given length of time (Tmc_read_max), any reads that exceed the memory controller's maximum rate will increase the average access time. Additionally, when a read cannot be accepted due to insufficient memory controller resources, the read incurs a retry penalty where the system waits for a period of time (Tmc_retry) before retrying the failed read operation. For a system where the retry period is less than the time required to complete a read, a read may need to be retried multiple times before the memory controller has capacity to accept it. The number of multiple retries increases as the requested reads increase and as the system retry period decreases. The effect of the retry penalty is shown below in Equations 38-42:

$$UTIL_{mc\_excess\_percentage} = \{0, BW_{mc\_total} \leq BW_{mc\_max} \tag{38}$$

$$\left\{ \frac{BW_{mc\_total} - BW_{mc\_max}}{BW_{mc\_max}}, BW_{mc\_total} > BW_{mc\_max} \right.$$

$$UTIL_{mc\_retry\_percentage} = T_{mc\_retry} / T_{mc\_read\_max} \tag{39}$$

$$N_{max\_retries} = \frac{UTIL_{mc\_excess\_percentage}}{UTIL_{mc\_retry\_percentage}} \tag{40}$$

$$T_{mc\_retry\_total} = \sum_{k=0}^{int(N_{max\_retries})} k \times T_{mc\_retry}, k = 0, 1, 2, \ldots , \tag{41}$$

$$int(N_{max\_retries}) + \frac{(int(N_{max\_retries}) + 1) \times}{(N_{max\_retries} - int(N_{max\_retries}))} \times T_{mc\_retry}$$

$$T_{mc\_retry\_avg} = T_{mc\_retry\_total} \times \frac{UTIL_{mc\_retry\_percentage}}{(BW_{mc\_total}/BW_{mc\_max})} \quad (42)$$

In addition to any retry penalty, the effect on Tram_access (in Equations 14 and 15) may be represented by the ratio of requested memory controller bandwidth (BWmc_total) to maximum memory controller bandwidth (BWmc_max), as shown below in Equations 43 and 44:

$$T_{spec\_read} = T_{cache\_miss} + T_{ram\_access}, \quad \left\{\frac{BW_{mc\_total}}{BW_{mc\_max}} \le 100\% \right. \quad (43)$$

$$= T_{cache\_miss} + T_{ram\_access} \times \quad \left\{\frac{BW_{mc\_total}}{BW_{mc\_max}} > 100\% \right.$$

$$\frac{BW_{mc\_total}}{BW_{mc\_max}} + T_{mc\_retry\_avg},$$

$$T_{demand\_read} = T_{coherency\_check} + T_{spec\_read} \quad (44)$$

By combining Equations 3, 28, 34, 43 and 44, a model may be defined to evaluate the effects of a speculative read policy on average read latency. These Equations include the following system-specific constants: Trd, Ta, Tbb, T cache_miss, Tcoherency_check, Tmc_read_max, Tmc_retry and BWmc_max. In addition, the following model parameters, BWmc_spec, BWsystem_read, and DEMAND_READpercent, may be used to define the requested memory controller bandwidth (BWmc_total) that will effect average read latency. BWmc_spec is the maximum bandwidth of the memory controller that is allowed for use on speculative read operations. Generally, BWmc_spec must be less then or equal to BWmc_max. BWsystemd_read is the bandwidth associated with system reads, e.g., read requests, prior to coherency a check and any resulting demand reads. DEMAND_READpercent is the percentage of system reads that, after undergoing a coherency check, are system demand reads that require data from the memory controller. The relationship between these parameters and BWmc_total is shown below in Equations 45 and 46.

$$BW_{mc\_demand} = \{0, \quad BW_{system\_read} \le BW_{mc\_spec} \quad (45)$$
$$\{(BW_{system\_read} - BW_{mc\_spec}) \times \quad BW_{system\_read} > BW_{mc\_spec}$$
$$DEMAND\_READ_{percent},$$

$$BW_{mc\_total} = \{BW_{system\_read}, \quad BW_{system\_read} \le BW_{mc\_spec} \quad (46)$$
$$\{BW_{mc\_spec} + BW_{mc\_demand}, \quad BW_{system\_read} > BW_{mc\_spec}$$

FIG. 6—Average Read Latency with 25% System Demand Reads

FIG. 6 shows an example of a read latency graph. For the purposes of simplicity, units of time as used herein for the discussion of FIG. 6 are defined in terms of the read transfer time (Trd) and constants related to time will be defined as a multiple of Trd. To avoid the need to explicitly specify the maximum memory controller bandwidth (BWmc_max), all bandwidth variables as used herein will be graphed in terms of a percentage of BWmc_max, where (i) (BWmc_spec)/(BWmc_max)≦100%; and (ii) (BWsystem_read)/(BWmc_max)≦400%. FIG. 6 shows the average read latency (in Trd units) on the Z-axis, the allowed speculative bandwidth as a percentage of maximum memory controller bandwidth (BWmc_spec/BWmc_max) on the X-axis, and the total system read bandwidth as a percentage of maximum memory controller bandwidth (BWsystem_read/BWmc_max) on the Y-axis. For the example illustrated in FIG. 6, DEMAND_READpercent=25% (fixed), Trd=1, Ta=10Trd; Tbb=10Trd; Nb=2(Tbb/Trd)=20; Tcache_miss=Trd, Tcoherency_check=5Trd; Tmc_read_max=2Ta=20Trd; and Tmc_retry=Tmc_read_max=20Trd.

Referring to FIG. 6, there are three main regions of operation for the memory controller. Region 193 is where all reads are dispatched speculatively. Region 194 is where some reads are speculative but all reads may be handled by the memory controller. Region 196 is where the memory controller is overwhelmed and retries are issued. The absolute read latency may be normalized by dividing the read latency when no speculative reads are issued to provide a simple percentage. If the normalized read latency is less than 100%, e.g., less than one, then speculative reads will improve performance. Conversely, if the normalized read latency is greater than 100%, speculative reads will have a negative impact on performance.

FIGS. 7a-7f—Normalized Read Latency

FIGS. 7a-7f show normalized read latency graphs in which DEMAND_READpercentage has been varied from 10%, 25%, 40%, 55%, 70%, and 85%, respectively. In each FIG. 7a-7f, line 198 indicates the lowest possible read latency for a given (BWsystem_read/BWmc_max) ratio, shown on the X-axis, i.e., an ideal. Line 200 shows a linear approximation or linear curve fit of line 198 that would allow a system to improve read latency by adjusting speculative read threshold percentages. Line 200 substantially corresponds to Equation 47 for the approximated speculative read threshold, discussed below.

FIG. 8—Interconnect Schematic for Algorithm to Reduce Read Latency

Adjusting the allowed percentage of speculative read requests based upon selected computer system states, such as memory controller workload and the rate of incoming requests, allows for a reduction in memory read latency. In one example, shown in FIG. 8, a computer system may utilize an algorithm to dynamically intermix demand and speculative memory requests to reduce memory read latency, i.e., regularly updating or computing the percentage of speculative read requests by continuously monitoring memory controller resources and system read rates. FIG. 8 is an interconnect schematic 212 for the speculative read threshold algorithm functions suitable for computer system 100 (shown in FIG. 1). System read monitor 202 monitors the system read request rate being presented to the memory controller prior to the coherency check (BWsystem_read). Because the maximum read rate of the memory controller may be a constant (BWmc_max), system read monitor 202 may provide data as a percentage relative to the maximum memory controller read rate (BWsystem_read/BWmc_max). System demand read monitor 204 monitors the percentage of system read requests that pass coherency checking and require data from the memory controller (DEMAND_READpercent). Memory controller speculative read monitor 206 monitors the percentage of memory controller resources currently being used for speculative reads (BWmc_spec_current/BWmc_max). Memory controller full monitor 208 monitors whether the memory controller can accept any more reads (BOOLEANmc_full). Speculative threshold decision function 210 receives data from monitors 202, 204, 206 and 208 and outputs BOOLEANspec_dispatch.

The speculative read threshold (BWmc_spec/BWmc_max) may be approximated by speculative threshold decision function 210 implementing the following equation:

$$\frac{BW_{mc\_spec}}{BW_{mc\_max}} = -1 \times \frac{BW_{system\_read}}{BW_{mc\_max}} \times \qquad \left\{ \frac{BW_{system\_read}}{BW_{mc\_max}} > 1 \right. \quad (47)$$

$$\frac{DEMAND\_READ_{percent}}{1 - DEMAND\_READ_{percent}} +$$

$$\frac{1}{1 - DEMAND\_READ_{percent}},$$

$$= 1. \qquad \left\{ \frac{BW_{system\_read}}{BW_{mx\_max}} \leq 1 \right.$$

In some examples, computer system 100 may have the option of delaying the speculative decision. For example, memory controller 108 may be full when the read request is first received, but a speculative decision may be made at the point when memory controller 108 is no longer full. Typically, a computer system realizes the greatest benefit in latency reduction when a speculative read is dispatched immediately. As the time period between receiving the read request and dispatching the speculative read increases, the benefit decreases.

Accordingly, the decision to dispatch speculatively may also be based on the amount of time from the initial request until the memory resources needed to fulfill the request become available (Treq). In some examples, computer system 100 may place a time limit on requests using a threshold for how long after a request arrives it may be eligible for speculative dispatch, (Treq_expired). In one example, the speculative dispatch time threshold (Treq_expired) is a selected percentage of the amount of time required to search a cache system of the computer system. The speculative dispatch time threshold (Treq_expired) may also be programmed or dynamically adjusted based on system parameters, such as memory controller workload and the rate of incoming requests.

Read expiration timer 211 verifies that a read request is recent enough to be considered for speculative dispatch (BOOLEANreq_expired), and the current read request being considered is the youngest available (BOOLEANyounger_req_avail). For example, if Treq≧Treq_expired, then BOOLEANreq_expired=true. Logic 160 may include queue 161 for pending read requests.

The decision (BOOLEANspec_dispatch) as to whether a read, e.g., pre-coherency check, should be speculatively dispatched may be based on the truth table shown below in

TABLE 1

| Inputs | Output (BOOLEAN$_{spec\_dispatch}$) |
|---|---|
| BW$_{mc\_current\_spec}$ ≧ BW$_{mc\_spec}$ BW$_{mc\_max}$ BW$_{mc\_max}$ | NO, do not dispatch speculatively |
| BOOLEAN$_{mc\_full}$ = true | NO, do not dispatch speculatively |
| BOOLEAN$_{req\_expired}$ = true | NO, do not dispatch speculatively |
| BOOLEAN$_{younger\_req\_avail}$ = true | NO, do not dispatch speculatively otherwise, YES, dispatch speculatively |

The speculative read threshold is regularly updated/computed by monitoring memory controller resources and system read rates. As different programs run in a computer, the pattern of read requests will change. The speculative read threshold algorithm may allow a hardware circuit to dynamically adapt to the constantly changing pattern of read requests as the system load changes over time. The speculative read threshold may be set based on the pattern of read requests (DEMAND_READpercent), system load (BWsystem_read/BWmc_max), and memory controller load (BWmc_spec_current/BWmc_max and BOOLEANmc_full). As a result, the disclosed system and method may remain effective as memory subsystems become more complex (e.g., multiple levels of memory hierarchy, multiple cores, multi-node/multi-bade systems, coherent memory space).

Because monitors 202, 204, 206 and 208 monitor various system and memory controller states, efficient function realization may require an examination in view of control system theory. Other examples may allow the output of the functions to either lead or lag the actual measured state to provide the ability to tune the total algorithm's effectiveness for a specific system and memory controller implementation or configuration. Some examples may use integer-only coding to simplify and minimize circuitry components. Conventional techniques for conversion of floating point algorithms to integer-only may be used.

Given the underlying non-linear nature of the "ideal" read threshold algorithm, the error term associated with linear-curve fit equation shown in Equation 47 may grow as the READ_DEMANDpercent approaches either 0% or 100%. For example, as shown in FIGS. 7a-7f, the example of the read threshold algorithm shown in Equation 47 has the greatest accuracy, i.e., compared to the ideal 198, over a READ_DEMANDpercent range of 25%-85%. To minimize the error term, various standard techniques may be used to generate a more discrete curve fit equation, such as additional linear segments, and table lookups, among other techniques.

From the foregoing detailed description of specific examples of the invention, it should be apparent that a system and method handling data requests based on available system resources has been disclosed. Although specific examples of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed examples without departing from the spirit and scope of the invention as defined by the appended claims which follow.

What is claimed is:

1. A method for handling speculative read requests for a memory controller in a computer system comprising the steps of:
providing a speculative read threshold corresponding to a selected percentage of a total number of reads to be speculatively issued;
intermixing demand reads and speculative reads in accordance with the speculative read threshold; and
determining the speculative read threshold based on a percentage of read requests that pass coherency checking and require data from the memory controller.

2. The method of claim 1, further comprising the steps of:
monitoring a selected computer system state; and
dynamically adjusting the speculative read threshold based on the selected computer system state.

3. The method of claim 2, further comprising the step of preventing a read request from dispatching as a speculative read request if a percentage of current memory controller resources being used for speculative reads is equal to or greater than the speculative read threshold.

4. The method of claim 3, further comprising the step of preventing the read from dispatching as a speculative read if the memory controller is full.

5. The method of claim 4, further comprising the step of preventing the read from dispatching as a speculative read if a time elapsed from when the memory controller receives the read request to when the memory controller has available resources is greater than a speculative dispatch time threshold.

6. The method of claim 5, further comprising the step of providing the speculative dispatch time threshold as a selected percentage of a period of time required to search a cache of the computer system.

7. The method of claim 6, further comprising the step of preventing the read request from dispatching as a speculative read if the read request is not a youngest available read request.

8. A computer system comprising
a CPU;
a memory controller;
memory;
a bus connecting the CPU, memory controller and memory;
circuitry for providing a speculative read threshold corresponding to a selected percentage of a total number of reads that can be speculatively issued;
circuitry for intermixing demand reads and speculative reads in accordance with the speculative read threshold; and
circuitry for determining the speculative read threshold based on a percentage of read requests that pass coherency checking and require data from the memory controller.

9. The computer system of claim 8, further comprising:
circuitry for monitoring a selected computer system state; and
circuitry for dynamically adjusting the speculative read threshold based on the selected computer system state.

10. The computer system of claim 9, further comprising circuitry for preventing a read request from dispatching as a speculative read request if a percentage of current memory controller resources being used for speculative reads is equal to or greater than the speculative read threshold.

11. The computer system of claim 10, further comprising circuitry for preventing the read from dispatching as a speculative read if the memory controller is full.

\* \* \* \* \*